United States Patent [19]

Miller

[11] 4,193,642
[45] Mar. 18, 1980

[54] SKID CONTROL SYSTEM
[75] Inventor: Roger L. Miller, Ann Arbor, Mich.
[73] Assignee: Kelsey Hayes Co., Romulus, Mich.
[21] Appl. No.: 648,786
[22] Filed: Jan. 13, 1976

Related U.S. Application Data

[63] Continuation of Ser. No. 482,449, Jun. 24, 1974, abandoned.

[51] Int. Cl.² .............................................. B60T 8/08
[52] U.S. Cl. ................................ 303/97; 188/181 A; 303/105; 361/238
[58] Field of Search ............... 188/181 A; 303/20, 21, 303/97, 103, 105, 107; 317/5; 324/162; 340/53, 62; 361/238

[56] References Cited

U.S. PATENT DOCUMENTS

| | | | |
|---|---|---|---|
| 3,017,145 | 1/1962 | Yarber | 303/21 BE |
| 3,574,426 | 4/1971 | Ruof | 303/21 CG |
| 3,606,490 | 9/1971 | Ando | 303/21 BE |
| 3,652,132 | 3/1972 | Ando et al. | 303/21 CG |
| 3,690,735 | 9/1972 | Arai et al. | 303/21 P |
| 3,710,186 | 1/1973 | Sharp | 317/5 |
| 3,870,376 | 3/1975 | Riordan | 303/21 P |
| 3,912,340 | 10/1975 | Bertolasi | 303/21 BE |

*Primary Examiner*—Charles E. Frankfort
*Assistant Examiner*—Reinhard J. Eisenzopf

[57] ABSTRACT

A skid control system which compares a current representative of wheel deceleration with an alterable reference current using an integrating comparator to control the brakes of a vehicle. The reference current has an initial value which represents a wheel deceleration indicative of an incipient skid condition and is increased to a substantially higher value after the current representative of wheel deceleration reaches the initial reference current value and is reduced to a very low value after a predetermined period of time. When the current representative of wheel deceleration exceeds the reference current by a predetermined degree as determined by the integrating comparator, the brakes are released. The brakes are reapplied after the current representative of wheel deceleration no longer exceeds the reference current at a time determined by the integrating comparator.

35 Claims, 6 Drawing Figures

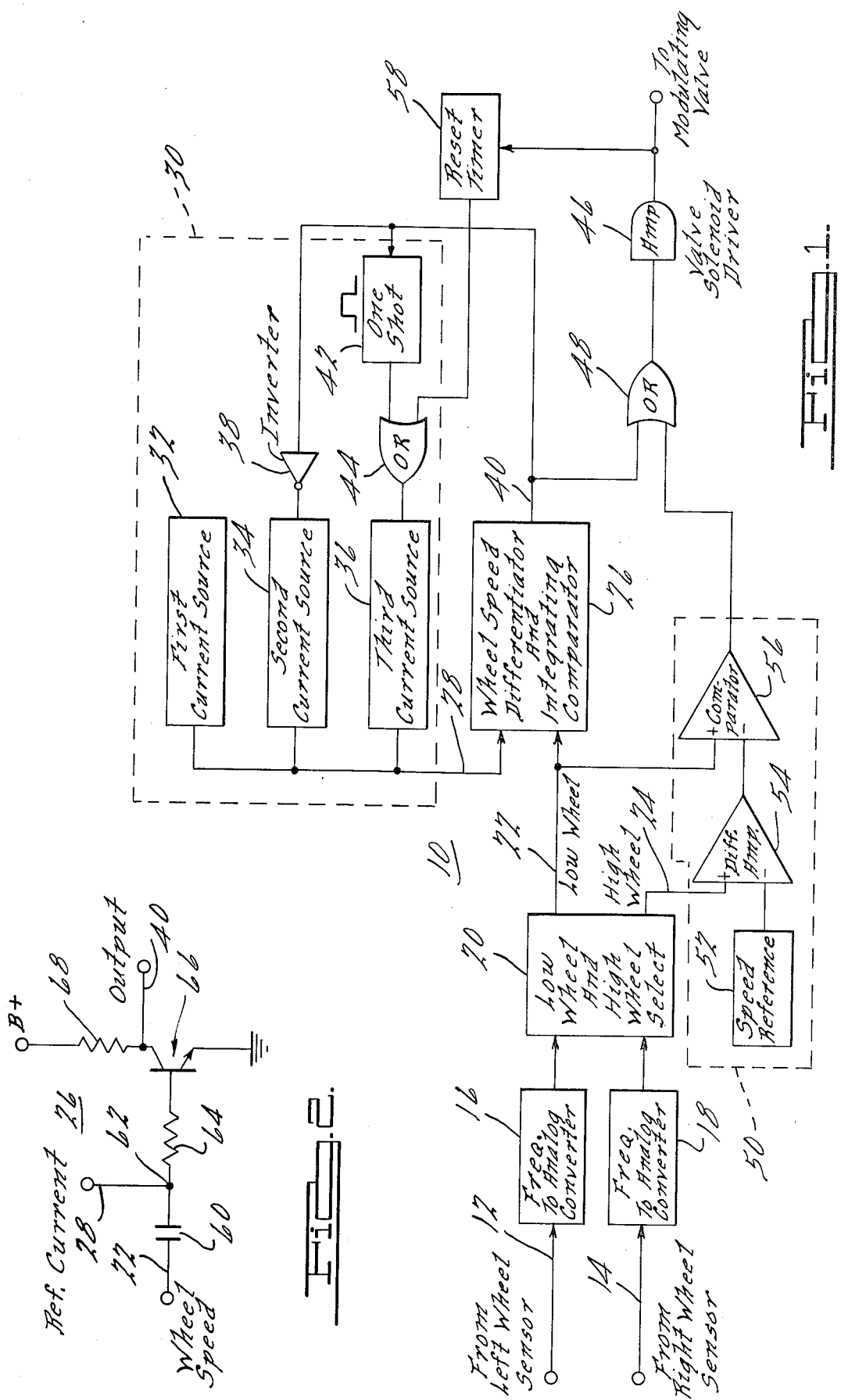

SKID CONTROL SYSTEM

This is a continuation, of application Ser. No. 482,449, filed June 24, 1974 now abandoned.

BACKGROUND AND SUMMARY OF THE INVENTION

The present invention relates to a skid control system in which the brakes are controlled by an integrating comparator which compares a current representative of wheel deceleration to a current which is altered to define a hypothetical wheel speed profile. More specifically, the reference current initially has a value representative of wheel deceleration occurring during an incipient skid condition. The integrating comparator receives the reference current and a current representative of wheel deceleration and provides an output signal when the current representative of wheel deceleration exceeds the reference current by a degree representing a predetermined decline in wheel velocity. The reference signal generator increases the reference current to a relatively high level in response to the output signal of the comparator. If the current representative of wheel deceleration exceeds this relatively high level within a predetermined period of time, the output signal from the comparator will be maintained thereby resulting in the release of the brakes. If the current representative of wheel deceleration does not exceed this relatively high level within the predetermined period of time, the output signal of the integrating comparator is terminated so that the brakes are not released. Presuming that the brakes are released, the reference signal generator reduces the reference current to a very low level at the expiration of the predetermined period of time. The output signal of the integrating comparator is terminated so as to initiate brake reapplication a predetermined period after the current representative of wheel deceleration no longer exceeds the reference current as determined by the integrating comparator. This period is established to approximate the time required for the wheel to spin up to the hypothetical wheel speed profile. On high mu surfaces, the current representative of wheel deceleration ordinarily will become sufficiently less than the reference current to terminate the output of the integrating comparator and reapply the brakes during the generation of the high level reference current. In the case of low mu surfaces, the current representative of wheel deceleration ordinarily will become sufficiently less than the reference current to terminate the output of the integrating comparator and reapply the brakes during the generation of the low level reference current.

The skid control system of the present invention utilizes a straightforward circuit of few components to provide skid control performance which meets or exceeds the performance of much more complex contemporary skid control systems. It may be readily constructed using conventional operational amplifiers. In view of the fact that operational amplifiers are mass produced in great quantities for a variety of uses and are therefore available at low cost, it will be appreciated that the skid control system of this invention can be produced at very low cost.

BRIEF DESCRIPTION OF THE DRAWINGS

FIG. 1 is a block diagram of the skid control system according to the present invention;

FIG. 2 is a schematic diagram of an exemplary embodiment of an integrating comparator which may be used with the skid control system of the present invention;

DETAILED DESCRIPTION OF THE PREFERRED EMBODIMENT

Figure 3:
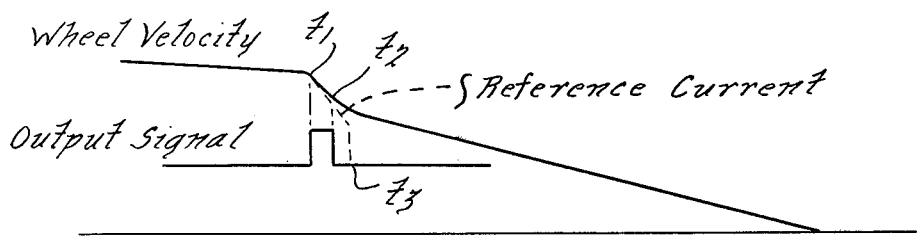
FIG. 3 is a first illustration of the operation of the skid control system of FIG. 1.

In FIG. 1 a skid control system 10 according to the present invention is illustrated. The skid control system 10 receives a signal having a frequency representative of the speed of a left wheel (front or rear) of the vehicle on line 12 and a signal having a frequency representative of the speed of the right wheel (front or rear) of the vehicle on line 14. The signals on lines 12 and 14 are converted to a DC signal having a magnitude representative of the speed of the respective wheels by frequency to analog converters 16 and 18. The signals from the frequency to analog converters 16 and 18 are supplied to a lower wheel and high wheel selected circuit 20 to yield a signal representative of the speed of the low wheel on line 22 and the speed of the high wheel on line 24. The signal on line 22 representing the speed of the low wheel is provided to a wheel speed differentiator and integrating comparator 26 which is illustrated in more detail in FIG. 2. The wheel speed differentiator and integrating comparator 26 receives a reference current on line 28 from a reference current generating circuit 30.

The reference current generating circuit 30 has a first current source 32 which generates a current representative of a very low wheel deceleration, for example, 1 to 6 ft/sec$^2$ with 5 ft/sec$^2$ being preferred. The reference signal generating circuit 30 also includes a second current source 34 which, together with the first current source, provides a current representative of a wheel deceleration which would occur during, or just prior to, an incipient skid condition, for example 17 to 22 ft/sec$^2$ with 17 ft/sec$^2$ (providing with the first source a current representing 22 ft/sec$^2$) being preferred. The reference current generating circuit 30 further includes a third current source 36 which provides a current representative of a very high wheel deceleration which is much greater than maximum non-skidding wheel deceleration, for example, 110 to 135 ft/sec$^2$ with 120 ft/sec$^2$ being preferred. The second current source 34 is controlled by a signal from an inverter 38 which is connected to receive the output signal on line 40 of the wheel speed differentiator and integrating comparator. The third current source 36 is controlled by a signal from a one-shot multivibrator 42 which is also connected to receive the output signal on line 40 of the wheel speed differentiator and integrating comparator. The output pulse of the one-shot multivibrator has a period of 60 to 90 milliseconds with 60 milliseconds being preferred. An OR gate 44 is interposed between the one-shot multivibrator 42 and a third current source 36 for reasons to be explained.

A solenoid driver 46 receives the output signal from the wheel speed differentiator and integrating comparator on line 40 via an output OR gate 48. The solenoid driver 46 is connected to the modulating valve for controlling the pressure to the brakes of the vehicle. The preferred modulating valve has a "knee" in the brake pressure rise curve. For example, one such modulating valve is disclosed in the patent to Stelzer, No. 3,560,056, issued Feb. 2, 1971. In lieu of the use of a modulating valve having a "knee" in the brake pressure rise curve, a wheel acceleration detector may be used in combination with an acceleration-controlled pulse modulator for detecting the wheel spinup rate and for pulsing the modulating valve during wheel spinup so that the brakes are more quickly applied for higher rates of wheel spinup.

The skid control system 10 incorporates a wheel speed differential override circuit 50 which operates in conjunction with the output OR gate 48 to release the brakes when the speed differential between the fastest rotating wheel and the slowest rotating wheel exceeds fifteen feet per second. The wheel speed differential override circuit 50 includes a current source 52 representing a reference wheel speed signal of fifteen feet per second and a differential operational amplifier 54 which receives the reference wheel speed signal and the high wheel speed signal to provide an output signal representing fifteen feet per second less than the high wheel speed. A comparator 56 receives the ouput signal of the differential operational amplifier 54 and the low wheel speed signal from line 22 and provides an output signal to the output OR gate 48 whenever the low wheel speed is more than fifteen feet per second less than the high wheel speed so that the output OR gate 48 will in turn provide a signal to the solenoid driver 46 to cause the release of the brakes.

A reset timing circuit 58 receives the output of the solenoid driver 46 and provides a signal to the OR gate 44 whenever the duration of the output signal from the solenoid driver 46 exceeds 1.5 second. As a result, for reasons to be explained, the third current source 36 provides a current representative of a wheel high deceleration whenever the output signal to the modulating valve exceeds 1.5 seconds.

In FIG. 2 an exemplary circuit diagram of a wheel speed differentiator and integrating comparator 26 which may be used in the system of this invention is illustrated. The wheel speed differentiator and integrating comparator 26 includes a differentiating capacitor 60 which receives a current representative of the speed of the wheel on line 22 and provides a current representative of the deceleration of the wheel to a junction 62. The reference current on line 28 is also provided to the junction 62 so that the junction 62 acts as a current summing junction. A resistor 64 connects the net current at the junction 62 to the base of a transistor 66. The collector of the transistor 66 is connected to the output line 40 and to B+ supply through a resistor 68 while the emitter of the transistor 66 is connected to ground. Consequently, the transistor 66 is normally biased to a conducting state by the reference current on line 28 so that its output signal at line 40 is normally low.

Since the transistor 66 is normally biased into a conducting state by the reference current flowing through resistor 64 to the base of transistor 66, a potential drop across resistor 64 exists which holds the junction 62 above ground. The potential at junction 66 must be pulled down to substantially ground potential before the transistor 66 will turn off to provide an output signal on output line 40. Consequently, before the transistor 66 will turn off to provide the output signal on line 40, the wheel speed signal must decrease at a sufficient rate and to a sufficient degree thereafter so that the control representative of wheel deceleration which is received at junction 62 not only matches the reference current on line 28, but overcomes the potential drop across resistor 64. This operation is more particularly described and illustrated graphically in the application of T. Atkins, Ser. No. 393,727, filed Sept. 4, 1973 now abandoned and assigned to the same assignee as this application, the disclosure of which is incorporated herein by reference thereto.

From an operational standpoint, the potential drop across resistor 64 requires that the wheel speed signal fall a predetermined amount after the wheel deceleration reaches a level which matches the wheel deceleration represented by the reference current. Since this requirement is met by a wheel speed decrease of a predetermined amount, as opposed to a deceleration increase, the requirement may be met by an excess wheel deceleration of high magnitude over a short period of time or by an excess wheel deceleration of a low magnitude over a longer period of time. In other words, the integral of deceleration with respect to time must reach a value which represents the predetermined wheel speed decrease to overcome the potential drop across resistor 64. For this reason, the circuit 26 is referred to herein as an integrating comparator.

In FIG. 3, a possible wheel speed behavior condition is illustrated by means of a wheel velocity trace. Also illustrated in FIG. 3 is a trace of the integral of the reference current and the output signal of the differentiator and integrating comparator 26 appearing on line 40. The integral of the reference current does not actually exist in the circuit, however, it is illustrated in FIG. 3 as illustrative of the principles of this invention. In this regard, it will be appreciated that the integral of the reference current represents a hypothetical velocity profile which corresponds to the magnitude of the reference current and the sequence in which it is changed. This hypothetical velocity profile is compared indirectly with the wheel velocity through the means of the comparison of the current representative of wheel deceleration and the reference current.

In FIG. 3, the wheel is seen to begin to decelerate so that at time t1 the wheel has not only exceeded the initial reference current representing twenty-two ft/sec$^2$ (the sum of the currents from the first current source 32 and the second current source 34), but has also decreased in velocity the requisite amount as established by the voltage drop across the resistor 64 so as to result in an output signal at line 40 from the wheel speed differentiator and integrating comparator 26. The signal on line 40 is provided to the one-shot multivibrator 42 and the inverter 38 so as to turn off the second current source 34 and turn on the third current source 36 to result in a new reference current representing a wheel deceleration of one hundred and twenty-five ft/sec$^2$ (the sum of the currents from the first current source 32 and the third current source 36). In the example of FIG. 3, the wheel does not decelerate above the one hundred and twenty-five ft/sec$^2$ rate established by the reference current so that the output signal on line 40 from the wheel speed differentiator and integrating comparator terminates at time t2. In the very short period in which the output signal on line 40 was provided, the modulating valve was not effective to release the brakes due to its inherent inertia. The fact that the wheel may be decelerating above the twenty-two ft/sec$^2$ initial rate during the period of the one-shot multivibrator 42, i.e. between times t1 and t3, does not cause the wheel speed differentiator and integrating comparator 26 to again turn on since the third current source 36 continues to provide its high level of current. In view of the above, it will be appreciated that conditions existed which indicated the imminent possibility of a skid condition, however, a skid condition did not actually occur. Nonetheless, the skid control system 10 reacted to the imminent possibility of the skid condition so that its reaction time would have been reduced in the event of an actual skid condition.

Figure 4:
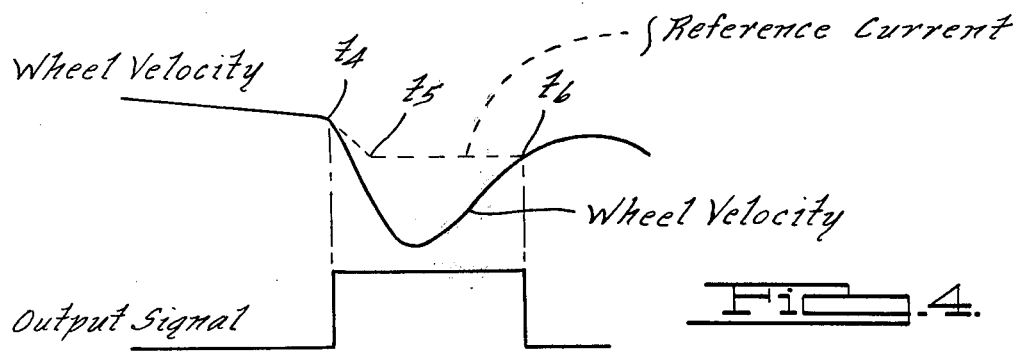
FIG. 4 is a second illustration of the operation of the skid control system of FIG. 1.

In FIG. 4, a possible wheel behavior trace is shown for a low mu surface. At time t4 the wheel has decelerated at a rate exceeding the twenty-two ft/sec$^2$ rate corresponding to the reference current, and the wheel speed has decreased the necessary degree thereafter, to result in the provision of an output signal on line 40. Since the wheel is on a low mu surface, the wheel deceleration continues at a high rate thereby resulting in a large wheel departure as illustrated. The third current source 36 is activated for the period of the one-shot multivibrator 42, e.g. sixty milliseconds, while the second current source 34 is turned off as previously explained. After the period of the one-shot multivibrator 42, at time t5, the third current source 36 is deactivated so as to result at time t5 in a low level reference current which is provided solely by the first current source 32. Due to the deep wheel departure, the potential at junction 62 has been pulled down far below ground potential. As a result, the transistor 66 is not turned on until after the wheel has accelerated for a substantial period of time so as to bring up the potential at the junction 62 sufficiently above ground potential to turn on transistor 66 at time t6. Accordingly, the condition shown in FIG. 4 in which the wheel speed is caused to return to the hypothetical ramp represented by the current sources is approximated. Consequently, the wheel is allowed to recover from the skid condition before the output signal on line 40 agains goes low and the brakes are reapplied.

Figure 5:
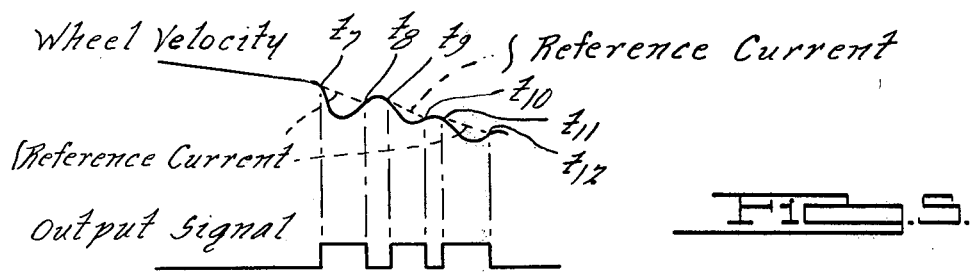
FIG. 5 is a third illustration of the operation of the skid control system of FIG. 1.

In FIG. 5, a possible wheel speed behavior trace is shown for a high mu surface. At time t7, the wheel has decelerated at a rate in excess of the twenty-two ft/sec$^2$ rate established by the first and second current sources 32 and 34, and has decreased in speed the requisite amount, to provide an output signal on line 40 at time t7. Consequently, at time t7, the one-shot multivibrator 42 activates the third current source 36 and the output signal at line 40 turns off the second current source 34 to provide a reference current representing a hypothetical fast ramp as illustrated. Since the wheel is on a high mu surface, the wheel quickly recovers so that it reaches the hypothetical ramp at time t8 causing the output signal from the wheel speed differentiator and integrating comparator 26 on line 40 to terminate. In actuality, the deceleration of the wheel had pulled down the potential at junction 62 below ground potential. After the wheel began accelerating, the potential at 62 was increased sufficiently by the increasing wheel velocity to again bring the potential at junction 62 sufficiently above ground potential to turn on the transistor 66 at time t8. It can be seen in the wheel speed trace of FIG. 5 that this cycle repeats between times t9 and t10, and between times t11 and t12.

Figure 6:
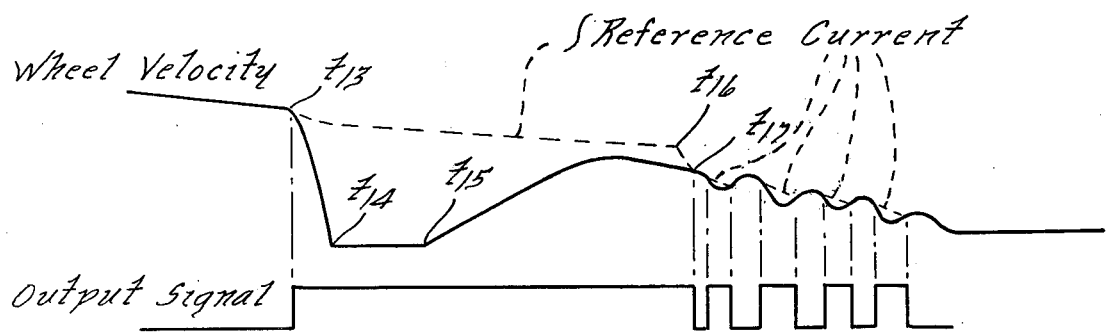
FIG. 6 is a fourth illustration of the operation of the skid control system of FIG. 1.

In FIG. 6, a possible wheel speed behavior trace is shown for a high mu surface in a vehicle having a very low normal force on a wheel during a braking condition. In this regard, under certain high mu braking conditions, the rear wheels of a short wheel base truck which has an empty cargo compartment will have very low loading or normal force on the rear wheels so that the rear wheels will decelerate beginning at time t13 to a rapid lock up condition by time t14 as illustrated in FIG. 6. The wheel speed is seen to recover to vehicle speed very gradually beginning at time t15. Since the vehicle is on a high mu surface, the vehicle will decelerate at a sufficient rate so that the vehicle speed will actually fall below the hypothetical ramp so that the wheel that is slowly spinning up will never reach the hypothetical ramp. Consequently, the brakes will remain released. To avoid this possible condition of continuous brake release even after the wheel has reached a speed which is synchronous with the vehicle speed, the reset timer 58 is provided to measure the duration of the output signal from the solenoid driver 46. When the duration of the solenoid driver output signal reaches 1.5 seconds at time t16, the reset timer provides a pulse to the OR gate 44 which in turn provides an output signal to activate the third current source 36. Upon activation, the third current source 36 provides a relatively high level current to the wheel speed differentiator and integrating comparator 26 which is effective to pull up the potential at the junction 62 to turn the resistor 66 on at time t17 thereby terminating the output signal to the modulating valve and causing reapplication of the brakes. In effect, this activation of the third current source 36 causes the hypothetical ramp to move sharply downward until it reaches the vehicle speed at time t17 to cause reapplication of the brakes. After brake reapplication, the brakes may be cycled in accordance with wheel speed behavior on a high mu surface as described with respect to FIG. 5 and as also shown in the rightward portion of the wheel speed trace of FIG. 6.

Although in the preferred embodiment disclosed herein, the wheel speed differentiator and integrating capacitor 26 is seen to receive the lowest wheel speed of a pair of wheels, it will be appreciated that the system may also be used using the average wheel speed of a pair of wheels or the highest wheel speed of a pair of wheels. If the average wheel speed is used, the brakes will be relieved when the "average" wheel skids, which may mean that both wheels have entered a skid condition or that one of the wheels has entered a severe skid condition while the other of the wheels has not begun to skid. If the high wheel speed is used, the brakes will not be relieved until the last of the two wheels enters a skid condition.

In view of the explanation of the operation of the skid control system 10, it will be appreciated that an important feature of this skid control system is its ability to anticipate a skid condition by detecting a condition which represents an impending skid or the imminent possibility of a skid condition. This is accomplished by providing a signal to the brake modulating valve in response to the deceleration of the wheel of a relatively low magnitude which does not in and of itself indicate that the wheel is skidding but only indicates that the wheel is very close to a skid condition thereby initiating the conditions for brake release. The system has an inhibitor which prevents the signal which is delivered to the brake modulating valve from being actually effective to release the brakes since the inhibitor operates to remove the signal before the brake modulating valve has the opportunity to actually execute the brake releasing command. Accordingly, the response time of the system to an actual skid condition is reduced.

In view of the above description of the skid control system 10 according to the present invention, it will be appreciated that an exceptionally straightforward control logic is utilized, especially when viewed in the light of the complexities of current commercial skid control systems. Nonetheless, it has been found that the performance of the skid control system of this invention is exemplary. A particularly meritorious feature of the present skid control system is the fact that it may be constructed using conventional operational amplifiers which are mass produced in great quantities for a variety of uses, and therefore, are available at low cost. Consequently, the skid control system of this invention can be produced at very low cost.

It is to be understood that the foregoing description is that of a preferred embodiment of the invention. Various changes and modifications may be made without departing from the spirit and scope of the invention as defined by the appended claims.

What is claimed is:

1. A skid control system for a vehicle having at least one wheel and a brake for said wheel comprising:
    wheel deceleration detecting means for providing a current representative of the deceleration of at least one wheel;
    reference generating means for generating a reference current of a first predetermined magnitude to represent a first rate of decline of said wheel speed including means for altering the magnitude of said reference current in response to an output signal to a reference current of a second predetermined magnitude to represent a second rate of decline of said wheel speed so that said reference current of said first and second predetermined magnitudes represents a predetermined wheel deceleration profile having said first and second rates of decline of said wheel speed;
    comparator means for comparing said current representative of wheel deceleration and said reference current for providing said output signal upon the attainment of a predetermined relationship therebetween to cause said reference generating means to alter the magnitude of said reference current, said comparator means subsequently comparing said current representative of said wheel deceleration and said reference current of said first and second predetermined magnitudes for providing a subsequent output signal upon the attainment of said predetermined relationship between said current representative of wheel deceleration and said reference current of said first and second predetermined magnitudes, said comparator means being responsive to the degree that said current representative of wheel deceleration and said reference current depart from said predetermined relationship therebetween in a manner so as to be approximately responsive to the degree that the wheel deceleration departs from said predetermined wheel deceleration profile for terminating said further output signal; and
    brake modulating means operative with said comparator means so that said brake is not modulated responsive to the provision of said first-mentioned output signal but is modulated responsive to the provision of said subsequent output signal, said brake modulating means being further responsive to the termination of said subsequent output signal for terminating the modulation of the brake.

2. A skid control system according to claim 1 wherein said means for altering the magnitude of said reference current increases the magnitude of said reference current in response to said output signal.

3. A skid control system according to claim 1 wherein said comparator means compares the magnitude of said current representative of wheel deceleration and the magnitude of said reference current and provides said output signal when the magnitude of said current representative of wheel deceleration attains a predetermined relationship with the magnitude of said reference current.

4. A skid control system according to claim 3 wherein said means for altering the magnitude of said reference current increases the magnitude of said reference current in response to said output signal.

5. A skid control system according to claim 3 wherein said comparator means is responsive to the period of time that said current representative of wheel deceleration exceeds the magnitude thereof when said predetermined relationship is attained for terminating said further output signal.

6. A skid control system according to claim 5 wherein said means for altering the magnitude of said reference current increases the magnitude of said reference current in response to said output signal.

7. A skid control system according to claim 1 wherein said first predetermined magnitude of wheel deceleration is between 22 and 27 feet per second$^2$.

8. A skid control system according to claim 1 wherein said second predetermined magnitude of wheel deceleration is between 115 and 140 feet per second$^2$.

9. A skid control system for a vehicle having at least one wheel and a brake for said wheel comprising:
    wheel deceleration detecting means for providing a current representative of the deceleration of at least one wheel;
    reference generating means for generating a reference current of a predetermined magnitude including means for altering the magnitude of said reference current in response to an output signal;
    control means for providing a brake release signal and a brake reapplication signal, said control means including comparator means for comparing said current representative of wheel deceleration and said reference current for providing said output signal a predetermined delay after the attainment of a predetermined relationship therebetween, said control means subsequently comparing said current representative of said wheel deceleration and said reference current of altered magnitude for providing said brake reapplication signal upon the attainment of said predetermined relationship between said current representative of wheel deceleration and said reference current of altered magnitude, said control means being responsive to the degree that said current representative of wheel deceleration and said reference current depart from said predetermined relationship therebetween so that the attainment of said predetermined relationship is increasingly delayed for increasing departures of said current representative of wheel deceleration and said reference current from said predetermined relationship therebetween; and
    brake modulating means responsive to said brake release signal for effecting the release of said brake and responsive to said brake reapplication signal for effecting the reapplication of said brake.

10. A skid control system according to claim 9 wherein said first predetermined magnitude of wheel deceleration is between 115 and 140 feet per second$^2$.

11. A skid control system according to claim 9 wherein said second predetermined magnitude of wheel deceleration is between 1 and 6 feet per second$^2$.

12. A skid control system according to claim 9 wherein said means for altering the magnitude of said reference current decreases the magnitude of said reference current in response to said output signal.

13. A skid control system according to claim 9 wherein said control means compares the magnitude of said current representative of wheel deceleration and the magnitude of said reference current and provides said output signal said predetermined delay after the magnitude of said current representative of wheel deceleration attains a predetermined relationship with the magnitude of said reference current.

14. A skid control system according to claim 13 wherein said means for altering the magnitude of said reference current decreases the magnitude of said reference current in response to said output signal.

15. A skid control system according to claim 13 wherein said control means is responsive to the period of time that the magnitude of said current representative of wheel deceleration exceeds the magnitude thereof prior to the attainment of said predetermined relationship causing said brake reapplication signal.

16. A skid control system according to claim 15 wherein said means for altering the magnitude of said reference current decreases the magnitude of said reference current in response to said output signal.

17. A skid control system according to claim 9 wherein said control means is responsive to the period of time that said current representative of wheel deceleration exceeds the magnitude thereof prior to the attainment of said predetermined relationship causing said brake reapplication signal.

18. A skid control system according to claim 17 wherein said means for altering the magnitude of said reference current decreases the magnitude of said reference current in response to said output signal.

19. A skid control system according to claim 9 wherein said predetermined delay is a period of time.

20. A skid control system according to claim 19 wherein said means for altering the magnitude of said reference current decreases the magnitude of said reference current in response to said output signal.

21. A skid control system for a vehicle having at least one wheel and a brake for said wheel comprising:
  wheel deceleration detecting means for providing a current representative of the deceleration of at least one wheel;
  reference generating means for generating a reference current of predetermined magnitude including means for increasing the magnitude of said reference current in response to an output signal and for decreasing the magnitude of said reference current after a predetermined delay after said first output signal;
  comparator means for comparing said current representative of wheel deceleration and said reference current for providing said output signal upon the attainment of a predetermined relationship therebetween, said comparator means subsequently comparing said current representative of said wheel deceleration and said reference current of increased magnitude for providing a subsequent output signal upon the attainment of said predetermined relationship between said current representative of wheel deceleration and said reference current of increased magnitude, said comparator still subsequently comparing said current representative of wheel deceleration and said reference current of decreased magnitude for terminating said subsequent output signal upon the termination of said predetermined relationship between said current representative of wheel deceleration and said reference current of decreased magnitude, said comparator being responsive to the degree that said current representative of wheel deceleration and said reference current depart from said predetermined relationship therebetween so that the attainment of said predetermined relationship is increasingly delayed for increasing departures of said current representative of wheel deceleration and said reference current from said predetermined relationship therebetween; and
  brake modulating means operative with said comparator means so that said brake is not modulated responsive to the provision of said first-mentioned output signal but is modulated responsive to said subsequent output signal, said brake modulating means being further responsive to the termination of said subsequent output signal for terminating the modulation of said brake.

22. A skid control system according to claim 21 wherein said reference current represents a first predetermined magnitude of wheel deceleration before said reference current is altered to represent a wheel deceleration of increased magnitude, said altered reference current representing a wheel deceleration of increased magnitude represents a second predetermined magnitude of wheel deceleration which is of substantially greater magnitude than said first predetermined magnitude of wheel deceleration, and said altered reference current representing a wheel deceleration of decreased magnitude represents a third predetermined magnitude of wheel deceleration which is of substantially decreased magnitude than said first and second predetermined magnitudes of wheel deceleration.

23. A skid control system according to claim 22 wherein said first predetermined magnitude of wheel deceleration is between 22 and 27 feet per second$^2$.

24. A skid control system according to claim 22 wherein said second predetermined magnitude of wheel deceleration is between 115 and 140 feet per second$^2$.

25. A skid control system according to claim 22 wherein said third predetermined magnitude of wheel deceleration is between 1 and 6 feet per second$^2$.

26. A skid control system according to claim 22 wherein said first predetermined magnitude of wheel deceleration is between 22 and 27 feet per second$^2$, said second predetermined magnitude of wheel deceleration is between 115 and 140 feet per second$^2$, and said third predetermined magnitude of wheel deceleration is between 1 and 6 feet per second$^2$.

27. A skid control system according to claim 21 wherein said comparator means compares the magnitude of said current representative of wheel deceleration and the magnitude of said reference current and provides said output signal when the magnitude of said current representative of wheel deceleration attains a predetermined relationship with the magnitude of said reference current.

28. A skid control system according to claim 27 wherein said comparator means is responsive to the period of time that the magnitude of said current representative of wheel deceleration exceeds the magnitude thereof prior to the attainment of said predetermined relationship causing said brake reapplication signal.

29. A skid control system according to claim 21 wherein said comparator means is responsive to the period of time that said current representative of wheel deceleration exceeds the magnitude thereof prior to the attainment of said predetermined relationship causing said brake reapplication signal.

30. A skid control system according to claim 21 wherein said predetermined delay is a period of time.

31. A skid control system for a vehicle having at least one wheel and a brake for said wheel comprising:
wheel deceleration detecting means for providing a current representative of the deceleration of at least one wheel;
reference generating means for generating a reference current of predetermined magnitude representing a first predetermined magnitude of wheel deceleration including means for increasing the magnitude of said reference current to represent a second predetermined magnitude of wheel deceleration of substantially greater magnitude than said first predetermined magnitude of wheel deceleration in response to an output signal and for decreasing the magnitude of said reference current to represent a third predetermined magnitude of wheel deceleration which is of substantially decreased magnitude than said first and second predetermined magnitudes of wheel deceleration after a predetermined delay after said first output signal;
comparator means for comparing said current representative of wheel deceleration and said reference current for providing said output signal upon the attainment of a predetermined relationship therebetween, said comparator means subsequently comparing said current representative of said wheel deceleration and said reference current of increased magnitude for providing a subsequent output signal upon the attainment of said predetermined relationship between said current representative of wheel deceleration and said reference current of increased magnitude, said comparator still subsequently comparing said current representative of wheel deceleration and said reference current of decreased magnitude for terminating said subsequent output signal upon the termination of said predetermined relationship between said current representative of wheel deceleration and said reference current of decreased magnitude; and
brake modulating means operative with said comparator means so that said brake is not modulated responsive to the provision of said first-mentioned output signal but is modulated responsive to said subsequent output signal, said brake modulating means being further responsive to the termination of said subsequent output signal for terminating the modulation of said brake.

32. A skid control system according to claim 31 wherein said first predetermined magnitude of wheel deceleration is between 22 and 27 feet per second$^2$.

33. A skid control system according to claim 31 wherein said second predetermined magnitude of wheel deceleration is between 115 and 140 feet per second$^2$.

34. A skid control system according to claim 31 wherein said third predetermined magnitude of wheel deceleration is between 1 and 6 feet per second$^2$.

35. A skid control system according to claim 31 wherein said first predetermined magnitude of wheel deceleration is between 22 and 27 feet per second$^2$, said second predetermined magnitude of wheel deceleration is between 115 and 140 feet per second$^2$, and said third predetermined magnitude of wheel deceleration is between 1 and 6 feet per second$^2$.

* * * * *